(12) United States Patent
Liddicott

(10) Patent No.: US 9,917,979 B2
(45) Date of Patent: Mar. 13, 2018

(54) PRINTED DOCUMENT CONTROL WITH VERIFIED UNIQUE WATERMARKS

(71) Applicant: DELL SOFTWARE INC., Round Rock, TX (US)

(72) Inventor: Samuel James Liddicott, West Yorkshire (GB)

(73) Assignee: SONICWALL INC., Santa Clara, CA (US)

( * ) Notice: Subject to any disclaimer, the term of this patent is extended or adjusted under 35 U.S.C. 154(b) by 0 days.

(21) Appl. No.: 15/631,946

(22) Filed: Jun. 23, 2017

(65) Prior Publication Data

US 2017/0289391 A1    Oct. 5, 2017

Related U.S. Application Data

(63) Continuation of application No. 14/968,455, filed on Dec. 14, 2015, now Pat. No. 9,723,171.

(51) Int. Cl.
| | |
|---|---|
| *H04N 1/32* | (2006.01) |
| *B41M 3/10* | (2006.01) |
| *B41F 9/00* | (2006.01) |
| *B41F 11/02* | (2006.01) |
| *B42D 25/40* | (2014.01) |

(Continued)

(52) U.S. Cl.
CPC ......... *H04N 1/32304* (2013.01); *B41F 9/003* (2013.01); *B41F 11/02* (2013.01); *B41M 3/10* (2013.01); *B42D 25/40* (2014.10); *D21F 1/46* (2013.01); *D21H 19/74* (2013.01); *D21H 21/40* (2013.01); *G03G 15/6582* (2013.01); *G06K 19/086* (2013.01); *G06K 19/10* (2013.01); *G06K 19/14* (2013.01); *G07D 7/12* (2013.01); *H04N 1/32144* (2013.01); *H04N 1/32288* (2013.01); *H04N 1/32293* (2013.01); *H04N 1/32299* (2013.01); *H04N 1/32325* (2013.01); *B42D 25/21* (2014.10); *B42D 25/333* (2014.10)

(58) Field of Classification Search
None
See application file for complete search history.

(56) References Cited

U.S. PATENT DOCUMENTS

| | | |
|---|---|---|
| 6,321,648 B1 | 11/2001 | Berson et al. |
| 6,801,723 B2 | 10/2004 | Herrmann et al. |

(Continued)

FOREIGN PATENT DOCUMENTS

JP     07323655     12/1995

OTHER PUBLICATIONS

U.S. Appl. No. 14/968,455 Office Action dated Nov. 18, 2016.

*Primary Examiner* — Scott A Rogers
(74) *Attorney, Agent, or Firm* — Polsinelli LLP

(57) ABSTRACT

Systems and methods are directed towards generating a verified unique watermark. More specifically, the systems and methods are directed towards generating a watermark that is as long as possible without any repetition. Such watermarks are possible by selecting characteristics of the watermark and methods for producing the watermarks (e.g., dandy rollers). By producing longer unique watermarks, users would be capable of generating longer rolls of paper whereby more sheets can be produced that each possesses a unique watermark. With the unique watermark, users can identify what information is printed on each sheet as well as authenticate the contents of each individual sheet.

16 Claims, 4 Drawing Sheets

(51) Int. Cl.
*G06K 19/08* (2006.01)
*G06K 19/10* (2006.01)
*G06K 19/14* (2006.01)
*G07D 7/12* (2016.01)
*G03G 15/00* (2006.01)
*D21F 1/46* (2006.01)
*D21H 19/74* (2006.01)
*D21H 21/40* (2006.01)
B42D 25/21 (2014.01)
B42D 25/333 (2014.01)

(56) References Cited

U.S. PATENT DOCUMENTS

| | | | |
|---|---|---|---|
| 7,188,774 B2 | 3/2007 | Pinchen et al. | |
| 7,540,421 B2 | 6/2009 | Pinchen | |
| 7,891,565 B2 | 2/2011 | Pinchen et al. | |
| 9,159,000 B1 * | 10/2015 | Ciccone | G06K 15/02 358/3.28 |
| 9,701,059 B2 * | 7/2017 | Comerio | B29C 59/002 264/40.7 |
| 2013/0270810 A1 | 10/2013 | Ross | |
| 2017/0171424 A1 | 6/2017 | Liddicott | |

\* cited by examiner

PRINTED DOCUMENT CONTROL WITH VERIFIED UNIQUE WATERMARKS

CROSS-REFERENCE TO RELATED APPLICATIONS

This Application is a continuation and claims the priority benefit of U.S. patent application Ser. No. 14/986,455 filed Dec. 14, 2015, now U.S. Pat. No. 9,723,171, the disclosure of which is incorporated herein by reference.

BACKGROUND OF THE INVENTION

Field of Invention

The present invention generally relates to watermarks. More specifically, the present invention relates to watermark based printing records.

Description of the Related Art

Watermarks have been used as a way to validate (i.e. security feature) paper sources for valuable documents such as money and vouchers. In particular, watermarks are used to ensure that the document containing the watermark is an original. The use of watermarks prevents some methods of forgery such as photocopying since the actual watermark is not easily replicated.

Watermarks are identifying images or patterns that are embedded within paper. Watermarks are generally produced through the use of the dandy roll process or the cylinder mold process during the manufacturing stage of paper. Although a dandy roller is generally a mesh drum that picks up fibers associated with the paper during manufacturing, the term dandy roller is generally referencing any roller that creates watermarks on paper such as a cylinder mold). Based on the thickness or density variations in the paper, the watermarks are capable of appearing as various shades of light and dark when viewed by transmitted light.

By incorporating watermarks in paper, the tracking of paper can be implemented. For example, a particular sheet of paper can be identified with a particular date, size, mill (i.e. mill trademark/location) and quality.

There is a need for more sophisticated recording means useable with watermarks. The recording means can track specifically what information was printed on what pages of a document. In this way, verification can be performed to identify what information was on the pages that may have been previously printed and postmarked. Furthermore, verification can be used to determine what information was on pages that may have been lost or on pages that may have been substituted.

SUMMARY OF THE CLAIMED INVENTION

A method for generating verified unique watermarks is presently claimed. The method is directed towards generating longer unique watermarks that can be used to track information about the paper. The longer unique watermarks may be generated by combining two or more marks that repeat at different times. For example, the two or more different marks may be embedded onto the paper during manufacturing by using dandy rollers having different circumferential lengths. By selecting the marks and circumferential lengths of the dandy rollers, longer watermarks can be generated that can subsequently be used to track more information.

DETAILED DESCRIPTION

The systems and methods described herein are directed towards producing a continual unique sequence of water marks usable during the manufacture of paper. The continual unique sequence of watermarks facilitates the ability for individual sheets to be identified and traced.

The systems and methods described herein also utilize the unique sequence of watermarks in recording what types of information (e.g., document, image) that was printed on the watermarked paper. Through the use of the recordation of what information is printed on the paper, a customer is capable of accounting for and controlling the use of the watermarked paper. The customer is then capable of validating the information printed on the watermarked paper to ensure that, for example, the paper is an original print (i.e. not a copy, modified, substituted).

Figure 1A:
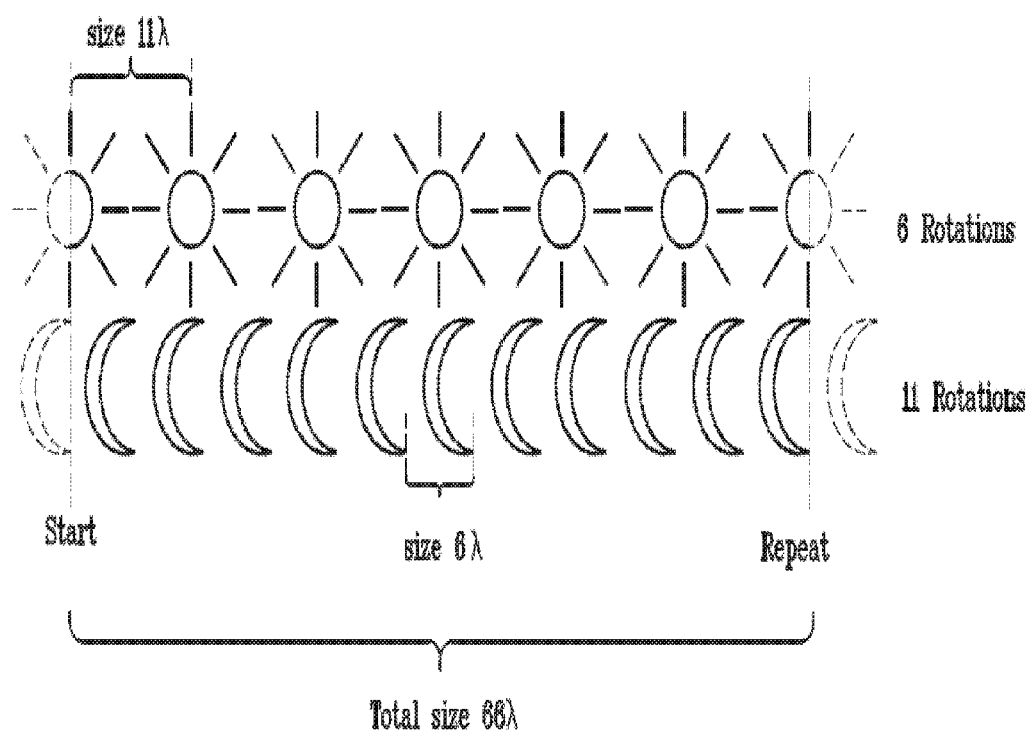
FIG. 1A-1C illustrates watermarks that are generated across paper using dandy rollers.
Figure 1C:
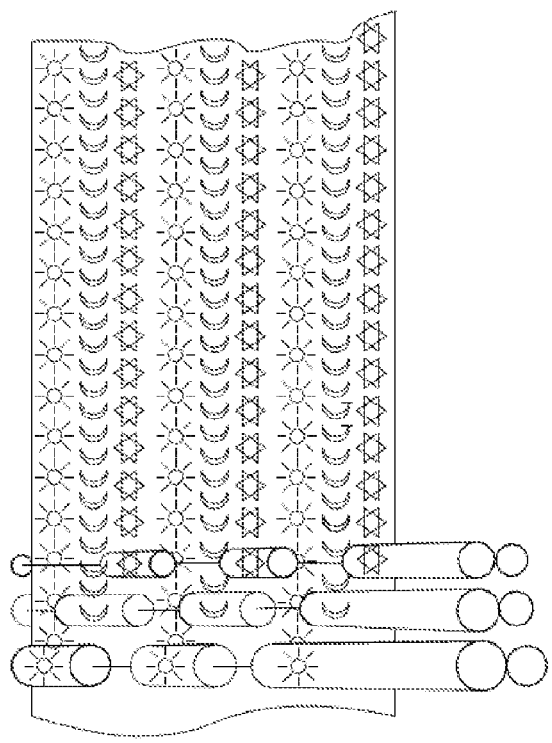

FIG. 1 illustrates watermarks that are generated across paper using dandy rollers. In particular, FIG. 1A illustrates watermarks that are generated from two dandy rollers. By using two dandy rolls, a much longer combined watermark can be generated that will be described in further detail below.

A continuously varying watermark may be achieved by using two or more dandy rollers (each with their own respective watermark as illustrated in FIG. 1A). Each of the dandy rollers may have different circumferences compared to each other. With the difference in circumference associated with each dandy roller, each dandy roller also has a different rotational speed. The difference in rotational speed is present because each dandy roller has to achieve the same linear speed matching the speed of the paper during manufacturing. With reference to FIG. 1A, a smaller dandy roller can be seen with the "moon" watermark while a larger dandy roller can be seen with the "sun" watermark.

It should be noted that the customer may select a variety of different types of visible marks that can be used as watermarks for the paper. For example, shapes and barcodes can be used as visible marks. So long as a selected mark is capable of being reliably recognized and decoded for information (e.g., offset), the customer can select any number of marks for use.

The information associated with the watermark may include a variety of different information. For example, the watermark used across the dandy rollers correspond to a binary representation of customer and production information, offsets between the dandy rollers, digital signatures, and any sort of information regarding the roller sizes, mark sizes, lag and properties of the paper.

Figure 1B:
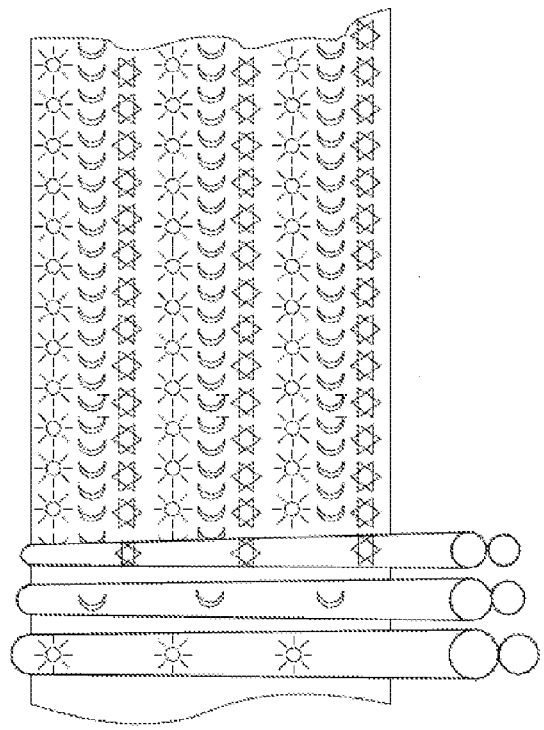

Another example configuration of watermarks compared to FIG. 1A can be seen in FIG. 1B. In particular, this embodiment illustrates a situation where three different marks are repeated across the paper to produce one unique watermark that can be used to identify a page. With the example in FIG. 1B, it may be possible that by using a resolution of 0.1 mm along with three separate marks (e.g., sun, moon, star) replicated three times each and repeating every 30 mm, the watermark is capable of 300 binary digits that could be used to encode information across a single line of paper. Furthermore, the three marks that are used in FIG. 1B can be provided using smaller rollers and not necessarily full-length rollers (see FIG. 1C).

Since the rotational speed and the circumference of each dandy roller are different, the rotational position of the two or more dandy rollers will change over time or over the length of paper. In other words, even though the watermarks for each of the dandy rollers will begin at a "start" position, a dandy roller with a smaller circumference will complete a revolution before a dandy roller with a larger circumference. Therefore, subsequent cycles will be offset (i.e. the smaller dandy roller will start a second cycle before a larger dandy roller finishes their first cycle). Returning to FIG. 1A, this can be seen where about two "moon" watermarks are produced for every one "sun" watermark.

The position of each dandy roller can be determined in the combined watermarks of the paper produced by the two or more dandy rollers (i.e. the "sun" and the "moon" watermarks) based on the total number of revolutions that can be performed without repeating the watermark during the manufacturing of the paper. Such a calculation corresponds to a total length of paper that can have a unique, non-repeated watermark generally based on the circumferences of the rollers. In an embodiment associated with FIG. 1A, the "sun" dandy roller has a circumference of 11λ while the "moon" dandy roller has a circumference of 6λ. It should be noted that when "λ" is referenced in the description and/or the figures, the symbol "λ" is being used to represent an arbitrary unit of length. Therefore, a maximum length for the combined and non-repeating watermark produced by these two dandy rollers will be 66λ (or a multiple of the circumferences of each of the dandy rollers used).

Once the 66λ has been reached, both dandy rollers will presumably reach their original "start" position. The watermarks produced after the 66λ mark will be identical to watermarks produced prior to the 66λ mark. Therefore, once the 66λ mark has been reached, it will be no longer possible to differentiate from paper with watermarks produced before and after the 66λ as these watermarks are identical.

It is possible, however, that a maximum length for the combined and non-repeating watermark produced is less than the multiple of the circumferences of each of the dandy rollers used. For example, if two dandy rollers used are common multiples of each other (e.g., 12λ and 6λ), both the dandy rollers would be at the "start" position at the point when the largest roller (e.g., 12λ) completes its first cycle. In this way, the smaller roller can be seen as being redundant/non-beneficial.

Therefore, a more accurate representation for the calculation for the maximum length for the combined and non-repeating watermark produced by two dandy rollers is achieved with the multiplying of the circumferences of the dandy rollers used in relation to the highest common factor (hcf) of the circumferences of the dandy rollers used. An equation is presented below:

$$\text{Max length} = \frac{C*c}{hcf(C, c)}$$

It should be noted that "C" and "c" represent the respective circumferences of each of the two dandy rollers used. Furthermore, the hcf( ) refers to the highest common factor associated with the two circumferences.

In situations where the highest common factor between two circumferences is 1 (e.g., 6λ and 11λ as illustrated in FIG. 1A), the multiplying of the corresponding circumferences of the dandy rollers can be performed to obtain the maximum length for the non-repeating watermark that can be achieved. However, as noted in the above example between 12λ and 6λ, situations where the highest common factor is not 1, the maximum length for the non-repeating watermark that can be achieved will be less than the multiplying of the corresponding circumferences of the dandy rollers used.

It should be noted that the circumferences for each of the dandy rollers should be represented using the same unit of measurement. In some embodiments, it may be preferred that the circumferences be converted into use with the smallest unit of measurement. Furthermore, the highest common factor associated with the above equation only returns integers. It should be noted that the circumferences of each of the dandy rollers, however, may be integer or non-integer.

With the above in mind, to achieve a longer total size before any repeat, the two circumferences for the dandy rollers (C and c) should be as large as possible while having the highest common factor between the two circumferences be as small as possible (preferably one). In an ideal embodiment the circumferences c (circumference of a smaller dandy roller) and C (circumference of a larger dandy roller compared to c) should be related based on the following equation: c=C−δ where δ (the circumferential difference between two dandy rollers) is kept as small as possible. In a preferred embodiment, δ could be chosen to be an irrational number so that either C or c will be irrational. In doing so, this could prevent the patterns between the dandy rollers from ever repeating.

However, it should be noted that available processes (e.g., rollers) and physical limitations present with the paper (e.g., thermal expansion) during the creation of the watermark may hinder the accuracy of the generated watermarks. In fact, there may be a physical limit with respect to the watermark measurements that could give rise to measurement errors when calculating offsets between the patterns from the dandy rollers.

In other embodiments, a δ can be chosen so that the pattern between dandy rollers repeats at a pre-determined point. Ideally, the δ chosen would be within the physical limitations described above so that indistinguishable offsets (that could give rise to measurement errors) are avoided.

A number of rotations (with respect to a particular roller) before the watermark pattern repeats between two dandy rollers can be obtained by calculating the max length of the pattern for both dandy rollers divided by the size of a particular roller. In the example, as illustrated in FIG. 1A, the max length of the two dandy rollers is 66λ. To calculate how many rotations the 11λ dandy roller would take before the pattern created by both dandy rollers repeats, the max length of the pattern is divided by the length of the selected dandy roller. Therefore, the 11λ roller will rotate 6 times (i.e. =66λ/11λ) before the two rollers (e.g., the 11λ and the 6λ) synchronize at the start position again thereby creating a repeating pattern again.

Other characteristics that that can be observed between two or more dandy rollers are the lead (l) and lag (Λ). In an embodiment where the watermark is being generated by two dandy rollers, the lead is always a positive value and coincides with a remainder of the circumference of the smaller dandy roller (e.g., c) divided into the larger dandy roller (e.g., C). In situations where the smaller dandy roller does not divide into the larger roller at least 2 times, the lead is equal to the circumferential difference between the smaller dandy roller and the larger dandy roller.

In contrast, when the lead is less than half of the circumference of the smaller dandy roller, this lead is referred to as lag. Lag corresponds to a situation where the smaller dandy roller appears to be behind rather than ahead of the larger dandy roller. It should be noted that the smaller the lag is between the two dandy rollers, the more revolutions will appear to be required in order for the two dandy rollers to re-synchronize.

The two dandy rollers (e.g., c and C) will not reach the start point of their pattern at the same time as the other until the lead/lag obtained is multiplied by an integer number corresponding to the number of revolutions of the larger roller so that the output is an exact multiple of the circumference of the smaller dandy roller.

When the two dandy rollers re-synchronize (i.e. both dandy rollers arrive at the start position of their watermark pattern after completing a rotation at the same time), the following conditions are true: 1) The accumulated circumferential difference is a multiple of the circumference of the smaller roller. 2) The accumulated lag is a multiple of the circumference of the smaller roller. 3) The number of rotation for a roller corresponds to the calculation identified above (e.g., max length divided by the circumference of the roller).

Although the above disclosure references dandy rollers, it is possible that such disclosures are also applicable to other methods of providing watermarks on paper in such as way so as to generate a longer, non-repeating watermark usable for uniquely identifying paper. For example, other methods for providing watermarks may include bump rollers, laser watermarks, and deposits of particles (e.g., phosphorous) or fibers into the paper. We note that the same principles described above for dandy rollers are also applicable to marks generated using alternative methods as well.

Although the present application is directed towards the generation of watermarks on paper using dandy rollers, it should be noted that the teachings are similarly applicable for other embodiments where security features are applied during manufacturing of the paper (e.g., metal ribbons with varying surface depth) that utilizes a periodic variation along with varying features (e.g., watermarks as described herein). The combination of the security features and the varying features similarly allows a manufacturer to produce a longer combination of variations that can be used to track information on more paper as described above.

Once the watermarks have been produced on the paper, these marks can then be processed (e.g., scanned via an imaging device) and decoded to obtain information associated with the marks. It should be noted that information associated with the marks present on the paper may be recorded as the paper is produced, cut and packaged. As described above, such information may include information about how the paper was manufactured or to identify particular sheets of paper with respect to the entire roll. This information, associated with the paper, may be stored for future reference. A cover sheet or RFID tag, for example, may facilitate or direct a user to where the information can be found. In some embodiments, the information can be digitally signed in order to ensure authenticity of the information associated with the paper.

Equipment already exists with the ability to scan watermarks on paper. In particular, a computer system controlling such equipment may be capable of producing a graduated intensity image of the scanned watermark. The produced image can then be subject to existing image processing techniques in order to recognize images and discover encoded data. For example, in order to obtain information about a particular sheet of paper, the computer system may need to calculate the offset of the watermark along the roll of the manufactured paper in order to identify a particular piece of paper. Information about the decoded image or watermark block along the scanned page along with a physical position of the image or watermark on the scanned page would be used to obtain this information.

Figure 2:
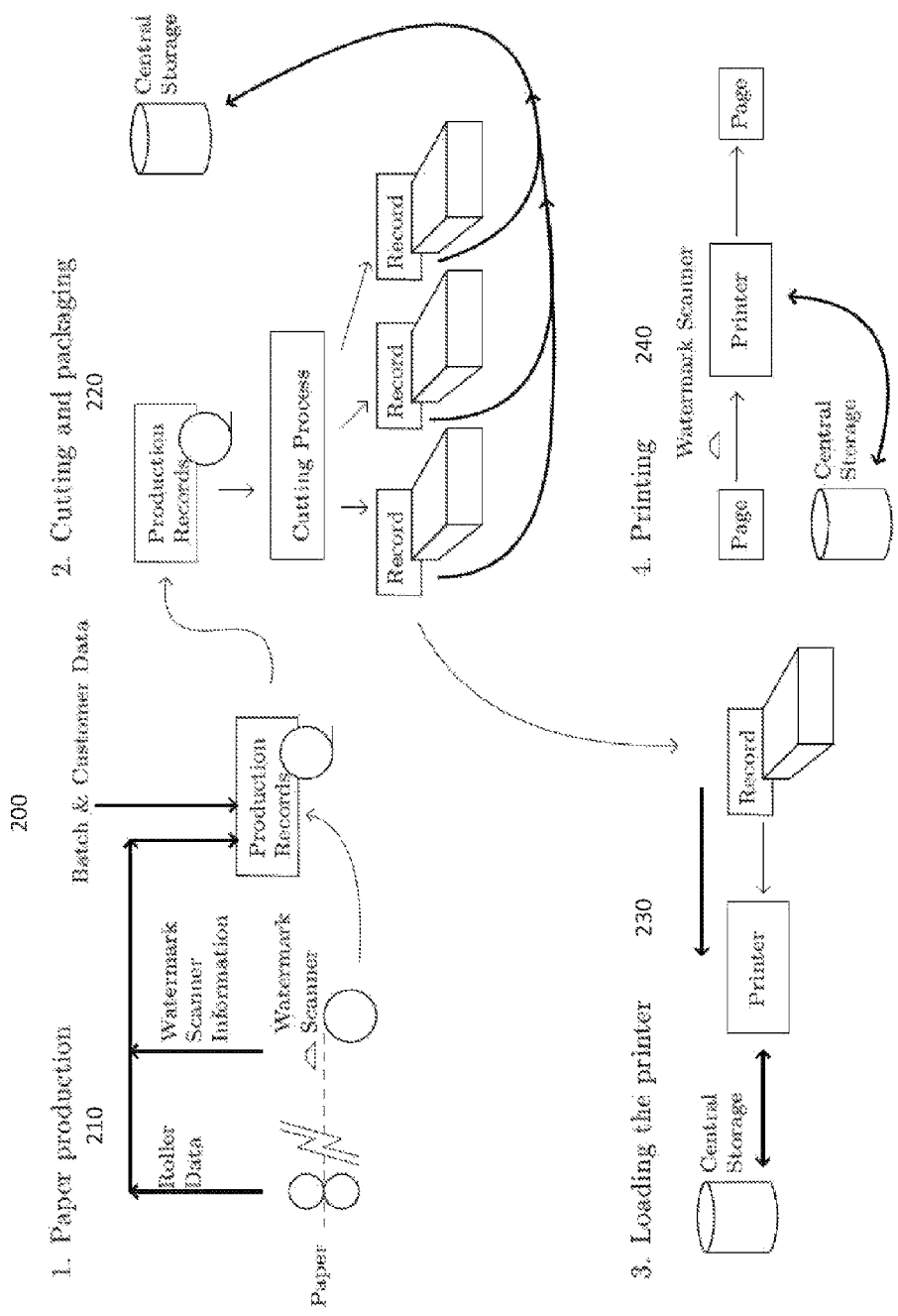
FIG. 2 illustrates an overall method whereby the watermarks described herein are generated, recorded, and used.

FIG. 2 illustrates an overall method 200 whereby the watermarks described herein are generated, recorded, and used. As described above, the generation of the watermarks on the paper is performed during paper production 210. The watermarks are produced on the roll of paper via one or more means described above (e.g., dandy roller). As the paper is spooled, the entire watermark for the roll of paper is scanned and recorded into memory.

Figure 3:
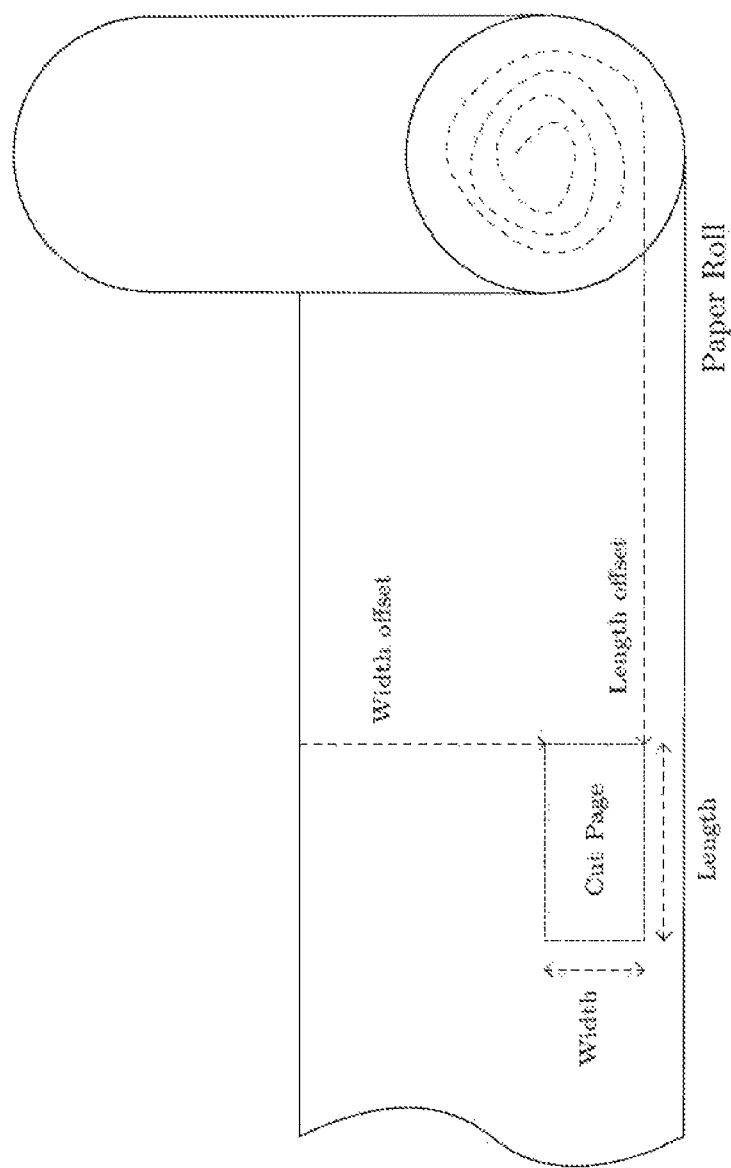
FIG. 3 illustrates a method for identifying the location of a particular sheet within the original paper roll.

During cutting and packaging 220, the entire roll of paper generated in 210 is cut into separate sheets and packaged into batches. Information about the watermarks for each sheet of paper or batch is also recorded and stored in memory. Such information may include, for example, information about a particular batch of paper (e.g., manufacturer date, paper type, customer information, sizing of the paper). Furthermore, information may also associate where the sheets of paper are associated along the entire length of the original roll of paper (e.g., length, width and offsets on the original roll). As illustrated in FIG. 3, the figure illustrates a method to identify the location of a particular sheet within the original paper roll. In particular, the information about the watermark(s) present on the sheet of paper, length, width and offsets can all be used to identify where exactly the sheet of paper was located on the original roll of paper prior to being cut.

Returning to FIG. 2, each sheet of paper is scanned while being loaded into a printer 230. The printer may be capable of scanning and storing information about the watermark into memory (e.g., printer, server). The unique watermark associated with each sheet of paper loaded into the printer corresponds to information about the particular page that can be retrieved from memory previously stored during the cutting and packing step 220. In this way, a sequence/order of the sheets loaded into the printer and later used for printing can be established.

It may be possible to utilize a printer that only accepts paper with the appropriate watermarks. In other embodiments, the printer may be instructed to print particular documents only on appropriately watermarked paper.

During printing 240, the printer where the paper is loaded into may also be capable of associating a particular sheet's identification (via the unique watermark) with information that is printed on that particular sheet. This association may also be stored within the printer or other memory location (e.g., server).

By using the stored information obtained during printing 240, a user can determine what information was printed on a particular sheet at a later time. The association made by the printer between the information and the watermark may include an image of what was printed on the page that can be used for authentication purposes.

With the above method, full accountability can be provided for all paper. The unique watermarks can be better utilized for situations where tracking authentic copies is necessary. The use of these watermarks would prevent forgeries. Furthermore, users would be capable of determining what is printed on each piece of paper thereby capable of determining whether any pages (and corresponding information included on those pages) are missing from an entire document.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for generating watermarks, the method comprising:
   selecting a first mark associated with a first circumferential factor;
   selecting a second mark associated with a second circumferential factor different from the first circumferential factor;
   aligning the first mark and the second mark at a starting position, wherein the first circumferential factor and the second circumferential factor correspond to a length of a paper and a distance between a first alignment and a second alignment of the first mark and the second mark; and
   imprinting the paper at the starting position, wherein an offset between the first mark and the second mark changes continuously across the imprinted paper based on the first circumferential factor and the second circumferential factor.

2. The method of claim 1, wherein the imprinting is performed at least in part by a plurality of rollers, wherein at least one of the rollers is associated with the first circumferential factor, and at least another of the rollers is associated with the second circumferential factor.

3. The method of claim 1, wherein the imprinting is performed at least in part by a laser.

4. The method of claim 1, wherein the imprinting is performed at least in part by depositing particles on the paper.

5. The method of claim 1, wherein at least one of the first mark and the second mark is a computer-readable image.

6. The method of claim 5, wherein the computer-readable images includes at least one of a barcode or a quick response (QR) code.

7. The method of claim 1, wherein a frequency of imprinting the first mark is based on the first circumferential factor, and wherein a frequency of imprinting the second mark is based on the second circumferential factor.

8. The method of claim 1, wherein a difference between the first circumferential factor and the second circumferential factor is associated with an irrational number.

9. The method of claim 1, wherein the first circumferential factor and the second circumferential factor have a highest common factor of 1.

10. The method of claim 1, further comprising:
    scanning at least a portion of the paper; and
    storing information associated with the scanned portion of the paper, wherein the stored information is grouped with other stored information associated with the portion of the paper.

11. The method of claim 1, further comprising:
    printing information onto at least a portion of the paper;
    associating the printed information with one or more locations of the first mark and one or more locations of the second mark imprinted on the at least portion of the paper; and
    storing information regarding the association between the printed information and the identified locations of the imprinted first mark and the imprinted second mark.

12. A system for generating watermarks, the system comprising:
    a first roller for imprinting a first mark, the first roller associated with a first circumferential factor;
    a second roller for imprinting a second mark, the second roller associated with a second circumferential factor different from the first circumferential factor, wherein the first mark and the second mark are aligned at a starting position, and wherein the first circumferential factor and the second circumferential factor correspond to a length of the paper and a distance between the first alignment and the second alignment of the first mark and the second mark; and
    a printer that imprints at least a portion of paper using the first roller and the second roller, wherein the paper is imprinted at the starting position, and wherein an offset between the first mark and the second mark changes continuously across the imprinted paper based on the first circumferential factor and the second circumferential factor.

13. The system of claim 12, wherein at least one of the first mark and the second mark is a computer-readable image.

14. The system of claim 13, wherein a difference between the first circumferential factor and the second circumferential factor is associated with an irrational number.

15. The system of claim 12, further comprising:
    a scanner that scans at least a portion of the paper; and
    memory that stores information associated with the scanned portion of the paper, wherein the stored information is grouped with other stored information associated with the portion of the paper.

16. A system for generating watermarks, the system comprising:
    memory that stores a first mark associated with a first circumferential factor and a second mark associated with a second circumferential factor different from the first circumferential factor;
    a processor that executes instructions stored in memory, wherein execution of the instructions by the processor generates a watermark based on aligning the first mark and the second mark at a starting position, and wherein the first circumferential factor and the second circumferential factor correspond to a length of a paper and a distance between a first alignment and a second alignment of the first mark and the second mark; and
    a laser that imprints paper with the watermark at the starting position, wherein an offset between the first mark and the second mark changes continuously across the imprinted paper based on the first circumferential factor and the second circumferential factor.

* * * * *